(12) United States Patent
Garrett et al.

(10) Patent No.: US 9,388,890 B2
(45) Date of Patent: Jul. 12, 2016

(54) BALL SCREW SEAL

(71) Applicant: Trelleborg Sealing Solutions US, Inc., Fort Wayne, IN (US)

(72) Inventors: Ronald G. Garrett, Brighton, CO (US); David H. Cummings, Jr., Thornton, CO (US); Larry J. Castleman, Monroeville, IN (US)

(73) Assignee: Trelleborg Sealing Solutions US, Inc., Fort Wayne, IN (US)

( * ) Notice: Subject to any disclaimer, the term of this patent is extended or adjusted under 35 U.S.C. 154(b) by 221 days.

(21) Appl. No.: 14/147,006

(22) Filed: Jan. 3, 2014

(65) Prior Publication Data

US 2014/0190287 A1     Jul. 10, 2014

Related U.S. Application Data

(60) Provisional application No. 61/749,741, filed on Jan. 7, 2013.

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/24* | (2006.01) |
| *F16H 25/22* | (2006.01) |

(52) U.S. Cl.
CPC ........ *F16H 25/2418* (2013.01); *F16H 25/2204* (2013.01); *Y10T 74/18712* (2015.01)

(58) Field of Classification Search
CPC .. F16H 25/2418; F16J 5/3208; F16J 15/3212; F16J 15/3204; F16J 15/3232; F16J 15/3236; F16C 33/7823
See application file for complete search history.

(56) References Cited

U.S. PATENT DOCUMENTS

| | | | | |
|---|---|---|---|---|
| 2,757,548 A | * | 8/1956 | Smith | F16H 25/2418 411/937.1 |
| 2,794,662 A | * | 6/1957 | Reynolds | F16J 15/3208 277/564 |
| 3,643,521 A | * | 2/1972 | Nilsson | F16H 25/2418 277/354 |
| 3,669,460 A | | 6/1972 | Wysong | |
| 4,052,076 A | | 10/1977 | Wysong | |

(Continued)

FOREIGN PATENT DOCUMENTS

| | | |
|---|---|---|
| DE | 1 137 275 | 9/1962 |
| DE | 36 41 682 A1 | 6/1988 |

OTHER PUBLICATIONS

French Search Report dated Feb. 5, 2016 for French Application No. 1450098 (6 pages).

*Primary Examiner* — David M Fenstermacher
*Assistant Examiner* — Jake Cook
(74) *Attorney, Agent, or Firm* — Taylor IP, P.C.

(57) ABSTRACT

A ball screw seal assembly which includes at least one energizer and a seal body, the ball screw seal assembly being configured for being positioned in a housing groove, the seal body including at least one outer diameter lip and two inner diameter lips, the at least one outer diameter lip being configured for contacting and sealing against the housing groove, the inner diameter lips being configured for wiping or scraping an outer surface of a threaded rod including a plurality of threads, the inner diameter lips being wipers or scrapers and being spaced apart from one another, the at least one energizer being configured for energizing and thereby biasing each of the inner diameter lips radially inwardly.

20 Claims, 7 Drawing Sheets

(56) References Cited

U.S. PATENT DOCUMENTS

| | | | |
|---|---|---|---|
| 4,095,533 A | 6/1978 | Leveille | |
| 4,175,475 A | 11/1979 | Eckhardt | |
| 4,226,431 A | 10/1980 | Jelinek et al. | |
| 4,407,511 A | 10/1983 | Benton et al. | |
| 4,744,571 A * | 5/1988 | Geberth, Jr. | F16J 15/3208 277/556 |
| 4,905,533 A | 3/1990 | Benton et al. | |
| 5,029,877 A * | 7/1991 | Fedeli | F16H 25/2418 277/354 |
| 5,555,771 A | 9/1996 | Kuroiwa et al. | |
| 5,799,953 A * | 9/1998 | Henderson | F16J 15/3236 277/554 |
| 5,979,904 A * | 11/1999 | Balsells | F16J 15/3236 277/554 |
| 6,161,838 A * | 12/2000 | Balsells | F16J 15/3216 277/511 |
| 6,178,839 B1 | 1/2001 | Yoshida et al. | |
| 6,276,225 B1 | 8/2001 | Takeda et al. | |
| 6,931,955 B2 | 8/2005 | Yatsushiro et al. | |
| 7,089,819 B2 | 8/2006 | Yabe et al. | |
| 7,128,199 B2 | 10/2006 | Yang et al. | |
| 7,430,933 B2 | 10/2008 | Yatsushiro et al. | |
| 2002/0023509 A1 | 2/2002 | Tsukada et al. | |
| 2005/0087029 A1 * | 4/2005 | Perni | F16H 25/2418 74/89.4 |
| 2009/0194945 A1 * | 8/2009 | Bhat | E21B 33/1212 277/300 |
| 2010/0066032 A1 * | 3/2010 | Girman | F16J 15/3236 277/522 |
| 2011/0006486 A1 * | 1/2011 | Niknezhad | F16J 15/3212 277/562 |
| 2011/0037234 A1 * | 2/2011 | Balsells | F16J 15/3212 277/562 |
| 2011/0140369 A1 * | 6/2011 | Lenhert | F16J 15/3216 277/589 |

* cited by examiner

BALL SCREW SEAL

CROSS REFERENCE TO RELATED APPLICATIONS

This is a non-provisional application based upon U.S. provisional patent application Ser. No. 61/749,741, entitled "BALL SCREW SEAL", filed Jan. 7, 2013, which is incorporated herein by reference.

BACKGROUND OF THE INVENTION

1. Field of the Invention

The present invention relates to seals, and, more particularly, to ball screw seals.

2. Description of the Related Art

Ball screw assemblies are known. Ball screw assemblies are able to translate rotational motion into linear motion. Ball screw assemblies include a housing (which can be referred to as a nut) and a threaded rod (which can be referred to as a ball screw). Anti-friction elements, such as ball bearings, can be used between the nut and the ball screw. For instance, ball bearings can be positioned in the grooves between threads of the ball screw and can also be positioned in a raceway formed by the interior surface of the nut. The interior of the nut can include a lubricant such as grease. A screw seal can be used at the end of the nut, the screw seal being positioned between the nut and the ball screw and serving to wipe contaminants from the ball screw and to keep grease or other lubricants internal for smooth, long lasting operation.

What is needed in the art is redundant wiping or scraping in a short axial space.

SUMMARY OF THE INVENTION

The present invention provides redundant wiping or scraping in a short axial space and to provide low friction, long lasting service in a variety of application conditions.

The invention in one form is directed to a ball screw seal assembly which includes at least one energizer and a seal body, the ball screw seal assembly being configured for being positioned in a housing groove, the seal body including at least one outer diameter lip and two inner diameter lips, the at least one outer diameter lip being configured for contacting and optionally sealing against the housing groove, the inner diameter lips being configured for wiping or scraping an outer surface of a threaded rod including a plurality of threads, the inner diameter lips being wipers or scrapers and being spaced apart from one another, the at least one energizer being configured for energizing and thereby biasing each of the inner diameter lips radially inwardly.

The invention in another form is directed to a ball screw seal system which includes a housing, a threaded rod, and a ball screw seal assembly, the housing including a housing groove, the threaded rod including a plurality of threads, the ball screw seal assembly being positioned in the housing groove, the ball screw seal assembly including at least one energizer and a seal body, the seal body including at least one outer diameter lip and two inner diameter lips, the at least one outer diameter lip being configured for contacting and optionally sealing against the housing groove, the inner diameter lips being configured for wiping or scraping an outer surface of the threaded rod, the inner diameter lips being wipers or scrapers and being spaced apart from one another, the at least one energizer being configured for energizing and thereby biasing each of the inner diameter lips radially inwardly and onto the outer surface of the threaded rod.

The invention in yet another form is directed to a method of using a ball screw seal assembly, the method including the steps of: providing a ball screw seal system which includes a housing, a threaded rod, and a ball screw seal assembly, the housing including a housing groove, the threaded rod including a plurality of threads, the ball screw seal assembly being positioned in the housing groove, the ball screw seal assembly including at least one energizer and a seal body, the seal body including at least one outer diameter lip and two inner diameter lips, the inner diameter lips being wipers or scrapers and being spaced apart from one another; contacting and optionally sealing the at least one outer diameter lip relative to the housing groove; energizing and thereby biasing, using the at least one energizer, each of the inner diameter lips radially inwardly and onto the outer surface of the threaded rod; and wiping or scraping, using the inner diameter lips, an outer surface of the threaded rod.

An advantage of the present invention is that a one-piece seal body having two different exclusion lips can be assembled in a much smaller space, thereby providing redundant wiping/scraping in a relatively short axial space.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
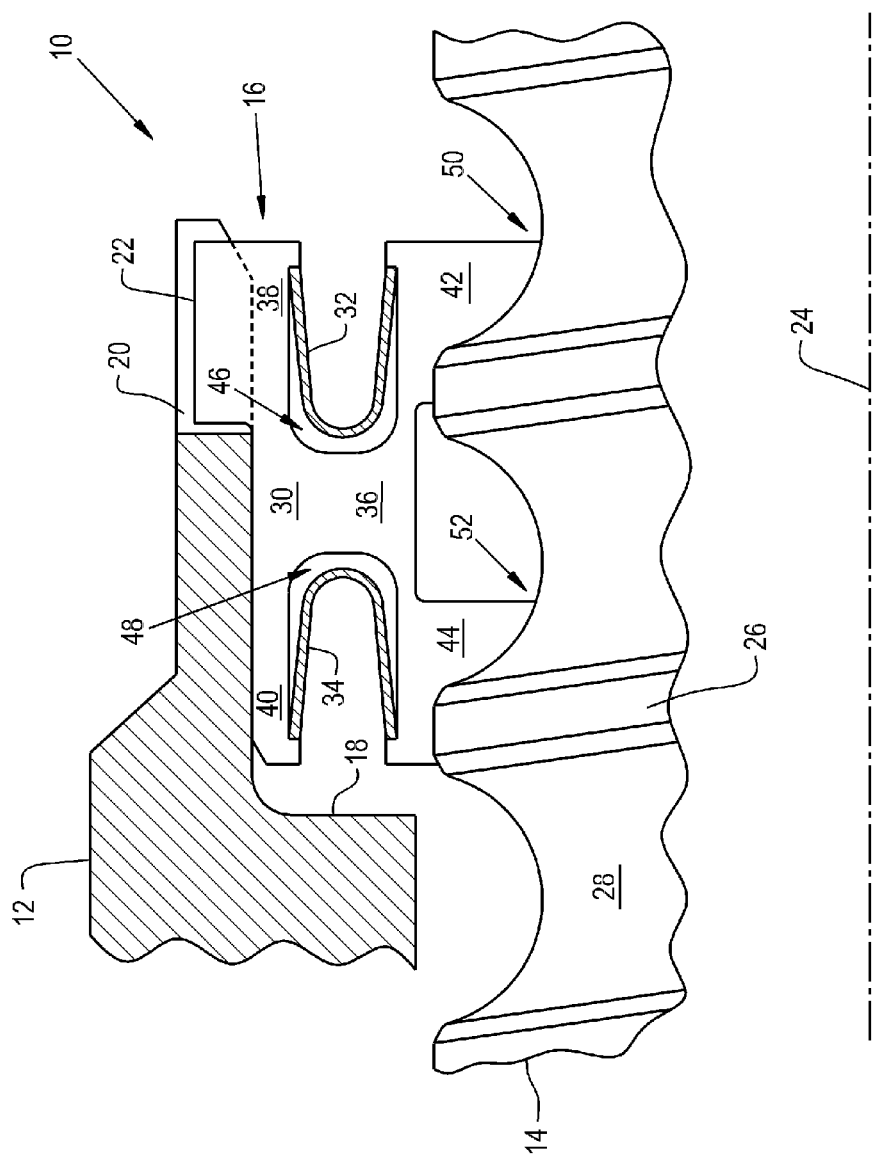
FIG. 1 is a cross-sectional view of a ball screw seal system according to the present invention.

Referring now to the drawings, and more particularly to FIG. 1, there is shown a ball screw seal system 10 according to the present invention. The ball screw seal system 10 includes a housing 12, a threaded shaft 14, and a seal assembly 16. In the various figures where a cross-sectional view is shown of a seal system, similar items have a multiple of 100 added to the two digit number used in FIG. 1. As in several of the drawings, FIG. 1 shows a cross-section of the ball screw seal system 10, more particularly, the top portion of the cross-section of the seal system 10. A ball screw can be used to translate rotational motion into linear motion with little friction. As such, as threaded shaft 14 rotates, housing 12 or threaded shaft 14 can move linearly relative to the other. FIG. 1 shows the outside of housing 12, being to the right-side (where debris or other contaminants is present) and the inside of the housing 12 being to the left-side (where clean grease is present).

The housing 12 of the ball screw seal system 10 can be a ball assembly that acts as a nut relative to the threaded shaft 14, which can act as a screw. Anti-friction elements, such as ball bearings for example, are not shown in the drawings, but it is understood that such anti-friction elements may be present in association with housing 12 and threaded shaft 14. Housing 12 has an annular housing groove 18. This housing groove 18 can be at one or both ends of housing 12, each housing groove 18 receiving seal assembly 16; the drawings show only one such end of housing 12. Housing groove 18 receives and thereby houses seal assembly 16. Housing groove 18 includes a profile which matches the profile of seal assembly 16. Housing groove 18 can include one, two, or more tab recesses 20 to receive a tab 22 of seal assembly 16, each tab 22 fitting in a corresponding tab recess 20 and thereby serving to prevent seal assembly 16 from moving (i.e., spinning, lateral movement) within housing groove 18. In one example, housing groove 18 has only two such recesses, and seal assembly 16 has only two such corresponding mating tabs 22. The material of housing 12 and thus housing groove 18 can be, for example, a mild steel or stainless steel; this is provided by way of example and not by way of limitation.

FIG. 1 shows a portion of threaded shaft 14 (which can be referred to herein as a threaded rod 14). It is understood that the threaded shaft 14 rotates about a longitudinal axis 24 which extends from left to right in FIG. 1. Threaded shaft 14 has a plurality of threads 26 and a plurality of grooves 28. Each thread can have a flat plateau, which can be referred to as a land (the lands are provided by way of example and not by way of limitation). Each groove is between adjacent threads 26. Threaded shaft 14 can be, for example, chrome coated (i.e., chromium plated) or carbide coated (below the coating can be, for example steel or any other suitable material); this is provided by way of example and not by way of limitation.

Seal assembly 16 (which can be referred to as a wiper assembly or a scraper assembly given that the primary function of the inner diameter lips 42 and 44 is wiping/scraping, as described below) has an annular ring configuration, but only a top portion of seal assembly 16 is shown. FIG. 1 shows that seal assembly 16 includes a seal body 30 and two energizers 32 and 34, which can also be referred to as springs 30 and 32. Seal body 30 can be made of, for example, an elastomer, a plastic, a fluoroplastic, or polytretrafluoroethylene (PTFE); this is provided by way of example and not by way of limitation. Seal body 30 (which can also be referred to as the seal material 30) can be formed by machining or molding. Seal body 30 includes a middle section 36, two outer diameter lips 38 and 40 attached to middle section 36, and two inner diameter lips 42 and 44 attached to middle section 36. Each outer diameter lip 38 and 40 can optionally seal against housing groove 18. Further, one outer diameter lip 38 (FIG. 1 shows that this outer diameter lip 38 faces axially to the outside) can have one or more tabs 22 that extend radially outwardly. As indicated above, two such tabs 22 (by way of example and not by way of limitation) can be provided, each tab 22 fitting in a corresponding recess 20 extending radially outwardly along housing groove 18. The outer diameter lips 38 and 40 can range from 0.5 mm to 0.75 mm in radial width (this dimension does not include tabs 22). Inner diameter lips 42 and 44 can have a varying radial width about the circumference of seal assembly 16 and can range from 0.75 mm to greater than 2.0 mm (i.e., 4.0 mm). Further, the axial width of seal body 30 can be about 12.7 mm (0.5 inch). These dimensions are provided by way of example and not by way of limitation. Each inner lip 42 and 44 can have an inner radial surface that varies over the inner circumference to match the outer contour of threaded rod 14, as indicated in FIG. 1. Thus, seal body 30 of the present invention advantageously provides a one-piece seal body 30 having two different exclusion lips (the inner diameter lips 42 and 44 which are wiper/scraper lips 42 and 44) which can be easily assembled in a much smaller space. Seal body 30 can be made of all the same material. Further, axially extending through-holes through seal body 30 may or may not be included in seal body 30; but, depending upon the design, such through-holes can defeat the purpose of keeping debris out of the interior of housing 12.

Further, one or more axially extending grooves (not shown) can be formed on the outside diameter of seal body 30, such grooves helping with the management of the lubricant (such as grease) in the interior of housing 12. This groove may not extend all of the way from the interior of housing 12 to the exterior of housing 12 but may be formed on the interior face of the outside diameter of seal body 30 and extend axially only part of the way on seal body 30 toward the exterior of housing 12. For instance, this groove may extend axially from the axial inner face (being open to the axial inner face of seal body 30) toward the axial outer face (not all of the way to the axial outer face of seal body 30) to a point just prior to the point that outer diameter lip 38 (the axial outer diameter lip) seals against the housing groove. This allows for pressure relief/backpumping. In other words, such a groove allows seal assembly 16 to vent something (for example, air, grease, lubricant, other pressurized media) from the inside of the nut to avoid seal assembly 16 from "blowing out" or "extruding" in some permanent deformation manner from the pressure. Such grooves are used to provide a channel where the pressure can act to energize a sealing lip (such as the axially inner outer diameter sealing lip) to momentarily lose contact with the housing groove wall to vent or "burp" the pressure. In another embodiment radial grooves (not shown) can be formed on the axial inner face of seal body 30. Such radial grooves can be used for this pressure relief and backpumping (to prevent the aforementioned blowing out or extruding) and can be linked with, so as to communicate with, the described outside diameter grooves. The axial and/or radial grooves (which can also be referred to as radial slots or channels) help avoid "blow-by" and facilitate back pumping and pressure relieving capability. If housing groove 18 is configured such that housing groove 18 includes a radial wall on the axial outside of seal assembly 16, then seal body 30 can include the outer diameter grooves extending from the axial outer face towards the axial inner face, as well as radial grooves on the axial outer face of seal body 30; any such axial outer grooves, however, would not necessarily link up with the axial inner grooves extending from the axial inner face but may be interrupted by seal material that seals with housing groove 18 (however, when the "burping" occurs, the media that is burped can pass from one outer diameter groove to the other outer diameter groove in an axial direction). While these axial and/or radial grooves are described with reference to FIG. 1, it is understood that such grooves can be applied to any of the embodiments described herein.

FIG. 1 shows that seal body 30 (which can also be referred to as a wiper body 30 or a scraper body 30 given the primary function of the inner diameter lips) thus forms two oppositely facing U-shaped recesses 46 and 48 (a U-shaped recess facing axially inwardly and a U-shaped recess facing axially outwardly). The outer diameter lip 40 facing axially inwardly, the inner diameter lip 44 facing axially inwardly, and middle section 36 of seal body 30 together form a U-shaped recess 48 facing axially inwardly. The outer diameter lip 38 facing axially outwardly, the inner diameter lip 42 facing axially outwardly, and the middle section 36 together form a U-shaped recess 46 facing axially outwardly. Each U-shaped recess 46 and 48 receives and holds therein a spring 32 and 34, which can be a cantilever spring. The cantilever spring can be less expensive than a slant coil spring or another type of energizer 32 and 34, but the same result can be achieved using a slant coil spring or another type of energizer. Springs 32 and 34 face axially opposite directions relative to one another. Stated another way, the two cantilever springs 32 and 34 are back-to-back to one another. Thus, the open portion of one spring faces axially inwardly, and the open portion of the other spring faces axially outwardly. The material of the cantilever springs can be, for example, stainless steel or Inconel® (which can be an austenitic nickel-chromium-based superalloy which can be used in high-temperature applications); this is provided by way of example and not by way of limitation. The cantilever spring can be inserted (by way of a manual process, or an automated process, or a semi-automated process) into the respective recess of the seal body 30 after machining the seal body 30 (alternatively, the spring can be overmolded by seal body 30 when forming seal body 30 by molding). Each spring 32 and 34 biases the corresponding outer diameter lip 38 and 40 radially outwardly and the corresponding inner diameter lip 42 and 44 radially inwardly. As shown in FIG. 1, the axially inner spring 34 uses the section of the seal body 30 below the heel area of the axially inner spring 34 to scrape threaded rod 14, at scraping point 52, which is in addition to the traditional (typical) scraping point 50, below the front end of spring 32 (the focus here on what is traditional or typical is on the location of the scraping point relative to the position of the spring, not to the overall design of the spring assembly or to the number and position of springs and lips). FIG. 1 points out that scraping point 52 is under the heel of spring 34 and the typical scraping point 50 is under the front end of spring 32. Seal assembly 16 thus includes at least energizers 32 and 34 energize a plurality of wiper/scraper lips 42 and 44. Positioning the axially-inner inner diameter lip 44 under the heel of the cantilever spring 34 (and the corresponding recess 48), an axial length of seal assembly 16 which is relatively short can be achieved.

A single lip may divide into two downwardly extending subparts around the circumference of the seal body 30 (formed as a ring), but this lip is still a single lip because these subparts receive their configuration by being part of the same seal lip; these subparts thus do not have an independent configuration relative to one another. Thus, the wiper/scraper lips in FIG. 1 are two separate lips because, while each inner diameter lip's individual configuration changes around the circumference of seal body 30 (formed as a ring), the two lips 42 and 44 have configurations which are independent of one another. Although the configurations of the two lips 42 and 44 are independent of one another, the configurations of the two lips 42 and 44 can be identical. The two inner diameter lips 42 and 44 face, and thus are oriented, in substantially the same direction relative to one another and thereby provide redundant wiping/scraping.

FIG. 1 shows that the inner diameter lips 42 and 44 are spaced apart from one another by at least one thread. The inner diameter lips 42 and 44 can be spaced apart from one another and be positioned relative to one another such that each of the inner diameter lips 42 and 44 wipes/scrapes only a part of an adjacent groove of the ball screw and also wipes/scrape at least part of the adjacent lands of the ball screw (as shown in FIG. 1).

Seal assembly 16 can be installed into the housing groove 18 by hand-installation. Alternatively, seal assembly 16 can be installed in housing groove 18 by an automated process or by a semi-automated process (a semi-automated process can include starting the installation by hand (manually) and finishing the installation by an automated process). These alternative methods of installing seal assembly 16 in housing groove 18 are provided by way of example and not by way of limitation. During installation of seal assembly 16 in housing groove 18, tabs 22 can be inserted in respective housing tab recesses 20 in housing 12.

In use, threaded shaft 14 and housing 12 can be rotated relative to one another (for example, threaded shaft 14 may be rotated while housing 12 is fixed, or vice versa). Whether rotating or not, inner diameter lips 42 and 44 serve to wipe or scrape threaded shaft 14 (thus, the inside diameter lips (that is the inner diameter lips) can be referred to as wiper lips 42 and 44 or scraper lips 42 and 44) and thereby to keep debris from the outside environment from entering the interior of housing 12. That is, the primary function of seal assembly 16 and thus both inside diameter lips 42 and 44 serve a wiping/scraping function (to wipe and/or scrape the threaded shaft 14) and thus to keep outside debris from entering into the interior of housing 12. This wiping/scraping function is accomplished, at least in part, by the geometry of inside diameter lips 42 and 44 (for example, the sharp geometry, as shown in the drawings) and by arranging the majority of the forces to be on the axial outside (the air side, the exterior side) of seal assembly 16, as opposed to the axial inside of seal assembly 16. Secondarily, one or both of the inside diameter lips 42 and 44, by virtue of wiping and/or scraping, can also be designed to provide a sealing function to keep grease or another lubricant (or at least much of the lubricant) from exiting the interior of housing 12 and departing to the outside of housing 12. However, the primary function of the inner diameter lips 42 and 44 is wiping/scraping.

Figure 2:
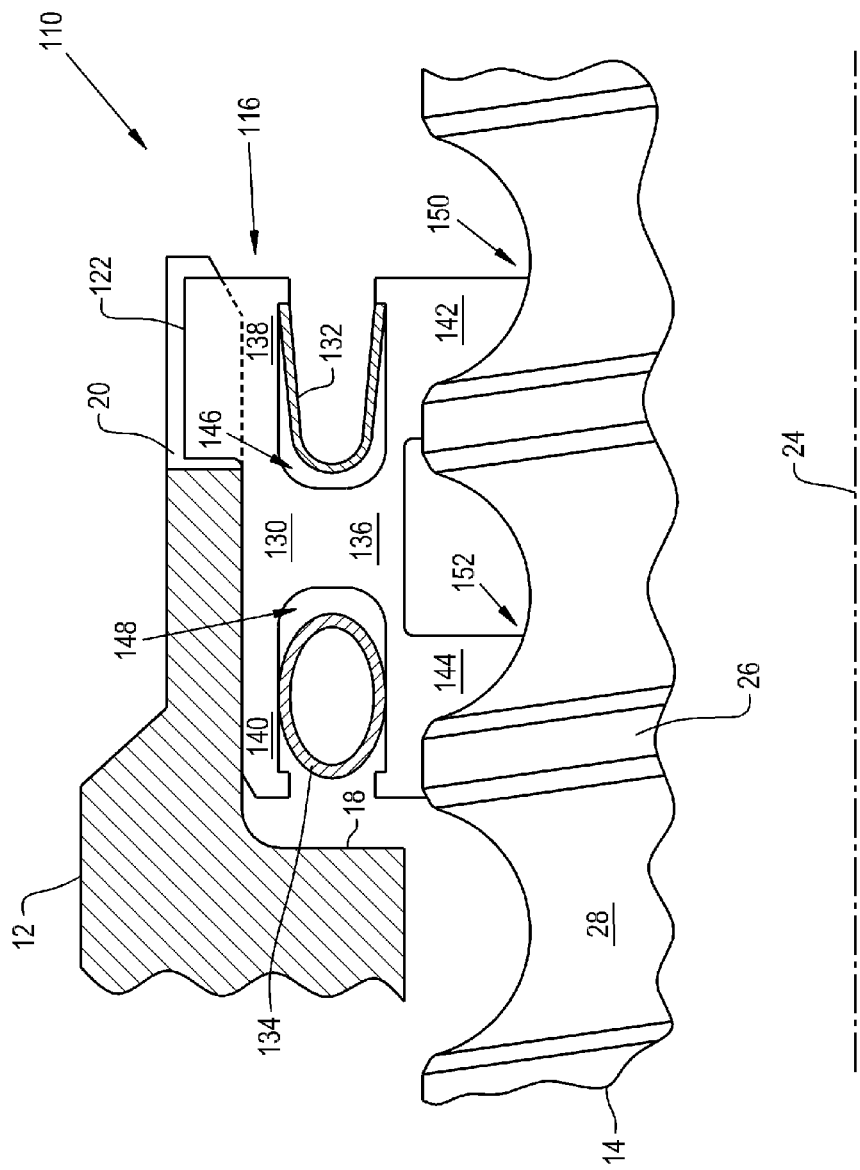
FIG. 2 is a cross-sectional view of another embodiment of the ball screw seal system according to the present invention.

FIG. 2 shows another embodiment of the ball screw seal system 110 of the present invention. The embodiment of the ball screw seal system 10 shown in FIG. 2 is substantially similar to the ball screw seal system 10 shown in FIG. 1. The primary difference between the embodiment of the present invention shown in FIG. 1 and the embodiment of the present invention shown in FIG. 2 pertains to one of the energizers 132 and 134. More specifically, the axially inner energizer 134 is a slant coil spring in FIG. 2, rather than a cantilever spring. The material of the slantcoil energizer 134 (which can be referred to as a slant coil spring 134) can be, for example, stainless steel or Inconel® (which can be an austenitic nickel-chromium-based superalloy which can be used in high-temperature applications); this is provided by way of example and not by way of limitation. Slant coil spring 134 biases the corresponding outer and inner diameter lips 140 and 144 radially outwardly from slant coil spring 134. Seal assembly 116 can be assembled, can be installed in the housing groove 18, and can function similarly to the embodiment of seal assembly 16 described relative to FIG. 1.

Figure 3:
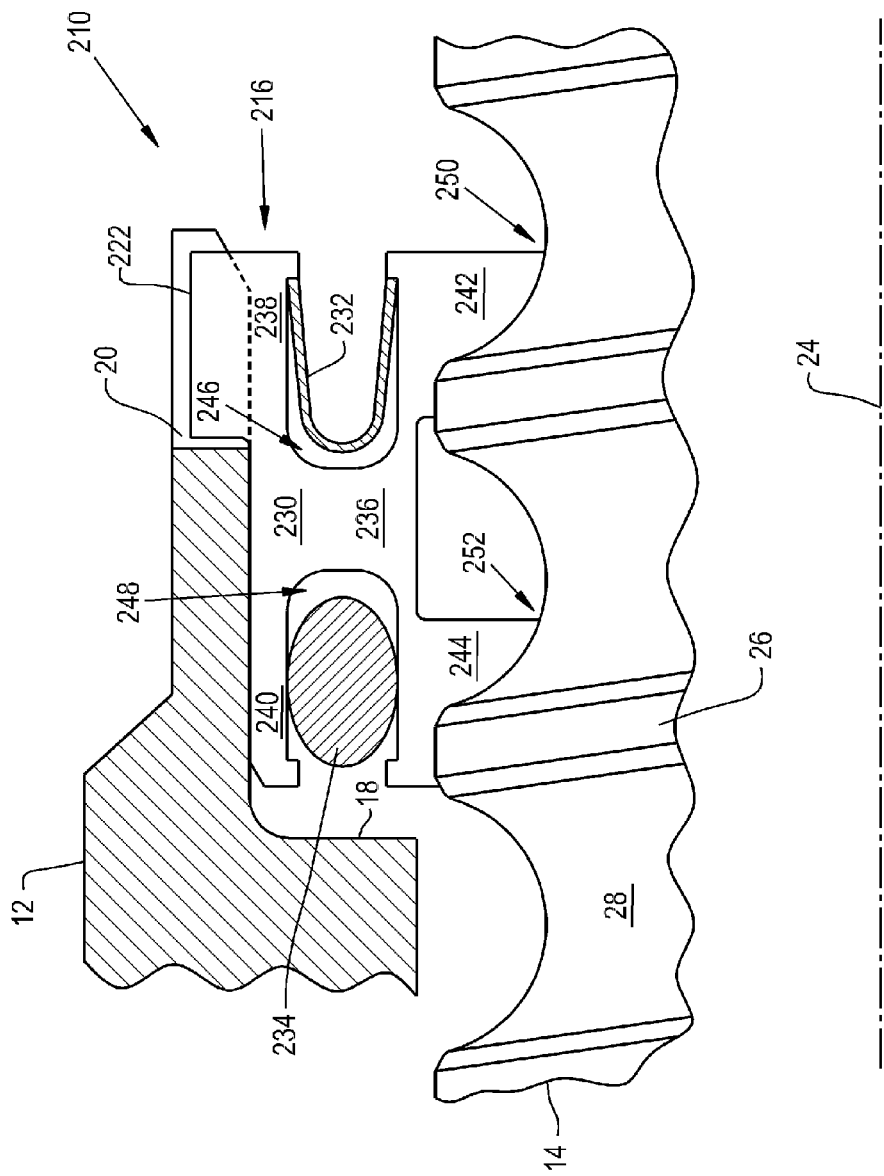
FIG. 3 is a cross-sectional view of yet another embodiment of the ball screw seal system according to the present invention.

FIG. 3 shows yet another embodiment of the ball screw seal system 210 of the present invention. The embodiment of the ball screw seal system 210 shown in FIG. 3 is substantially similar to the ball screw seal system 10 shown in FIG. 1. The primary difference between the embodiment of the present invention shown in FIG. 1 and the embodiment of the present invention shown in FIG. 3 pertains to one of the energizers 232 and 234. More specifically, the axially inner energizer 234 is an O-ring in FIG. 3, rather than a cantilever spring. The material of the O-ring energizer 234 can be, for example, an elastomer, a plastic, a fluoroplastic, or polytetrafluoroethylene (PTFE); this is provided by way of example and not by way of limitation. O-ring 234 biases the corresponding outer and inner diameter lips 240 and 244 radially outwardly from O-ring 234. This embodiment of seal assembly 216 can be assembled, can be installed in the housing groove 18, and can function similar to the embodiment of seal assembly 16 described relative to FIG. 1.

Figure 4:
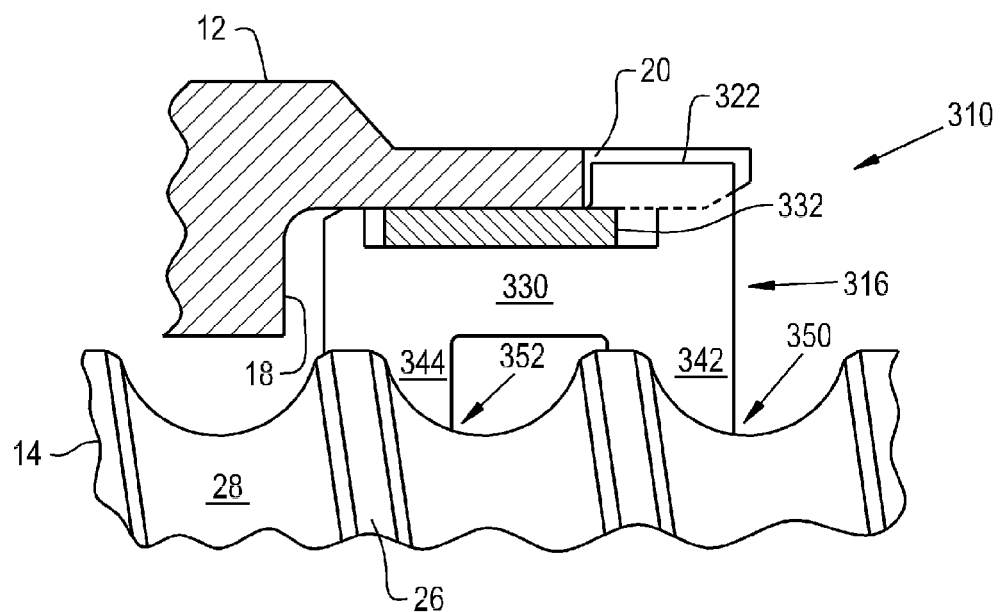
FIG. 4 is a cross-sectional view of yet another embodiment of the ball screw seal system according to the present invention.
Figure 5:
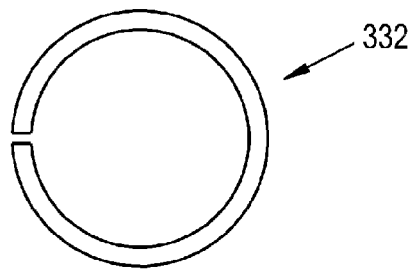
FIG. 5 is a side view of an energizer used in the inventive embodiment of FIG. 4.
Figure 6:
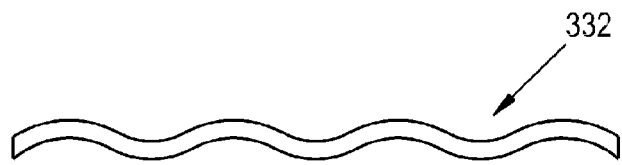
FIG. 6 is a cross-sectional view of an alternate energizer to be used in the inventive embodiment of FIG. 4.

FIG. 4 shows yet another embodiment of the ball screw seal system 310 of the present invention. The embodiment of ball screw seal system 310 shown in FIG. 4 is similar to the ball screw seal system 10 shown in FIG. 1; certain differences are highlighted herein. Ball screw seal system 310 includes housing 12 and a seal assembly 316. Seal assembly 316 includes a seal body 330 with outer and inner diameter lips. Outer diameter lips 338 and 340 function similarly to the outer diameter lips 38 and 40 in FIG. 1. Inner diameter lips 342 and 344 also function similarly to the inner diameter lips 42 and 44 of FIG. 1 and can have substantially the same spacing between one another as shown in FIG. 1. Seal assembly 316 also includes an energizer 332 which can be a single flat band expander 332, as shown in FIG. 5 as a side profile, or a wave spring 332, as shown in FIG. 6 as a cross-sectional view, which is positioned in an outer radial recess of seal body 330. This side profile of FIG. 5 shows that the flat band expander has a generally circular configuration and is broken at one point to allow the flat band expander to be compressed or to expand. The free ends of the flat band expander can be expanded to assemble the flat band expander into the recess of the seal body 330 (this assembly can be done manually or in an automated or semi-automated process). The flat band expander is an energizer 332 and functions to hold the inner diameter lips 342 and 344 on the threaded rod. This embodiment of seal assembly 316 can be installed in housing groove 18 similarly to the embodiment of the seal assembly 16 described relative to FIG. 1. The material of the flat band expander can be, for example, stainless steel, plain steel, or Inconel® (which can be an austenitic nickel-chromium-based superalloy which can be used in high-temperature applications); this is provided by way of example and not by way of limitation. Rather than having a split, the free ends of the flat band can alternatively be welded together (for example, the free ends can be welded together, and then the flat band can be installed in the outer diameter recess on the seal body 330). As an alternative to what is shown in FIG. 4, seal body 330 can have one or more energizer recesses as shown in FIG. 1 (recesses facing axially inwardly and/or outwardly), and an energizer 32 (as described above relative to FIGS. 1-3) can be installed in a respective such recess; thus, the seal assembly 316 of FIG. 4 can have the flat band expander, as well as additional energizers 32 and 34, thereby forming a combination of what is shown in FIG. 4 and what is shown in FIG. 1 (or FIG. 2 or 3), for example.

FIG. 6, as mentioned above is a side profile view of energizer 332 in the form of wave spring 332. This side profile shows that the wave spring has a wave configuration. Further, while not shown in FIG. 4 or 6, wave spring 332 can be pretensioned and thus be formed in a generally circular configuration with two free ends like the flat band expander of FIG. 5 and can be broken at one point to allow wave spring 332 to be compressed or to expand. The free ends of the wave spring can be expanded to assemble the wave spring into the recess of the seal body 330 (this assembly can be done manually or in an automated or semi-automated process). Wave spring 332 is an energizer 332 and functions to hold the inner diameter lips 342 and 344 on threaded rod 14. This embodiment of the seal assembly 316 can be installed in the housing groove 18 similarly to the embodiment of the seal assembly 16 described relative to FIG. 1. The material of the wave spring can be, for example, stainless steel, plain steel, or Inconel® (which can be an austenitic nickel-chromium-based superalloy which can be used in high-temperature applications); this is provided by way of example and not by way of limitation. Rather than having a split, the free ends of the wave spring can alternatively be welded together (for example, the free ends can be welded together, and then the wave spring can be installed in the outer diameter recess on seal body 330). As an alternative to what is shown in FIG. 4, seal body 330 can have one or more energizer recesses, as shown in FIG. 1 (recesses facing axially inwardly and/or outwardly), and an energizer (as described above relative to FIGS. 1-3) can be installed in a respective such recess; thus, the seal assembly 316 of FIG. 4 can have wave spring 332, as well as additional energizers 32 and 34, thereby forming a combination of what is shown in FIG. 4 and what is shown in FIG. 1 (or FIG. 2 or 3), for example.

Figure 7:
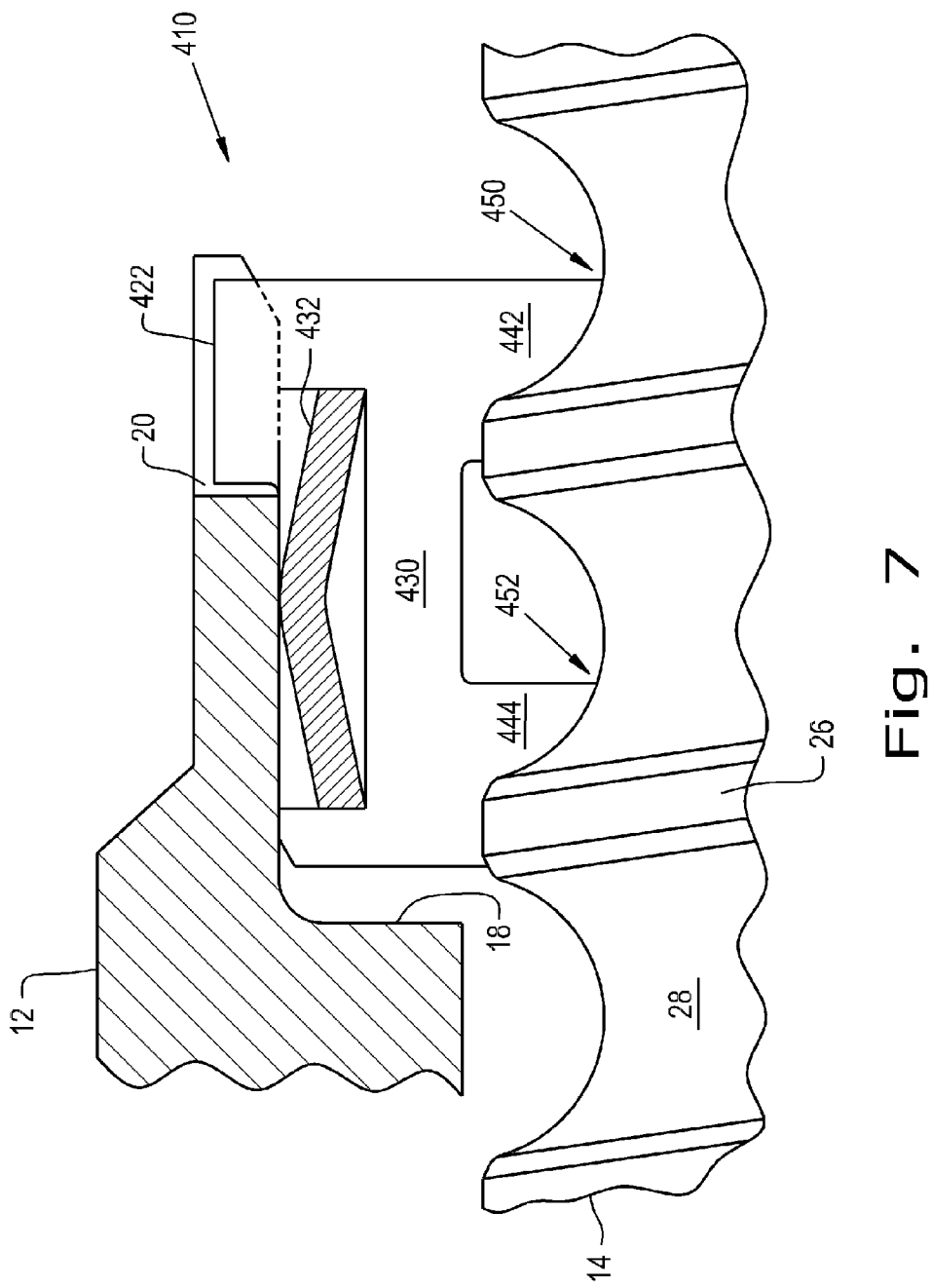
FIG. 7 is a cross-sectional view of yet another embodiment of the ball screw seal system according to the present invention.

FIG. 7 shows yet another embodiment of a ball screw seal system 410 of the present invention. The embodiment of ball screw seal system 410 shown in FIG. 7 is similar to the ball screw seal system 10 shown in FIG. 1; certain differences are highlighted herein. Ball screw seal system 410 includes housing 12 and a seal assembly 416. Seal assembly 416 includes a seal body 430 with outer and inner diameter lips. The outer diameter lips function similarly to the outer diameter lips 38 and 40 in FIG. 1. The inner diameter lips 442 and 444 also function similarly to the inner diameter lips 42 and 44 of FIG. 1 and can have substantially the same spacing between one another as shown in FIG. 1. The seal assembly 416 also includes a single chevron spring 432 which is positioned in an outer radial recess of seal body 30. Chevron spring 432 has an angled configuration. Further, while not shown in FIG. 7, chevron spring 432 can be pretensioned and thus be formed in a generally circular configuration with two free ends like the flat band expander in FIG. 5 and be broken at one point to allow chevron spring 432 to be compressed or to expand. The free ends of chevron spring 432 can be expanded to assemble chevron spring 432 into the recess of seal body 430 (this assembly can be done manually or in an automated or semi-automated process). Chevron spring 432 is an energizer 432 and functions to hold inner diameter lips 442 and 444 on threaded rod 14. This embodiment of the seal assembly 416 can be installed in housing groove 18 similarly to the embodiment of the seal assembly 16 described relative to FIG. 1. The material of chevron spring 432 can be, for example, stainless steel, plain steel, or Inconel® (which can be an austenitic nickel-chromium-based superalloy which can be used in high-temperature applications); this is provided by way of example and not by way of limitation. Rather than having a split, the free ends of chevron spring 432 can alternatively be welded together (for example, the free ends can be welded together, and then the chevron spring can be installed in the outer diameter recess on the seal body 430). As an alternative to what is shown in FIG. 7, seal body 430 can have one or more energizer recesses as shown in FIG. 1 (recesses facing axially inwardly and/or outwardly), and an energizer (as described above relative to FIGS. 1-3) can be installed in a respective such recess; thus, the seal assembly 416 of FIG. 7 can have chevron spring 432, as well as additional energizers 32 and 34, thereby forming a combination of what is shown in FIG. 7 and what is shown in FIG. 1 (or FIG. 2 or 3), for example.

Figure 8:
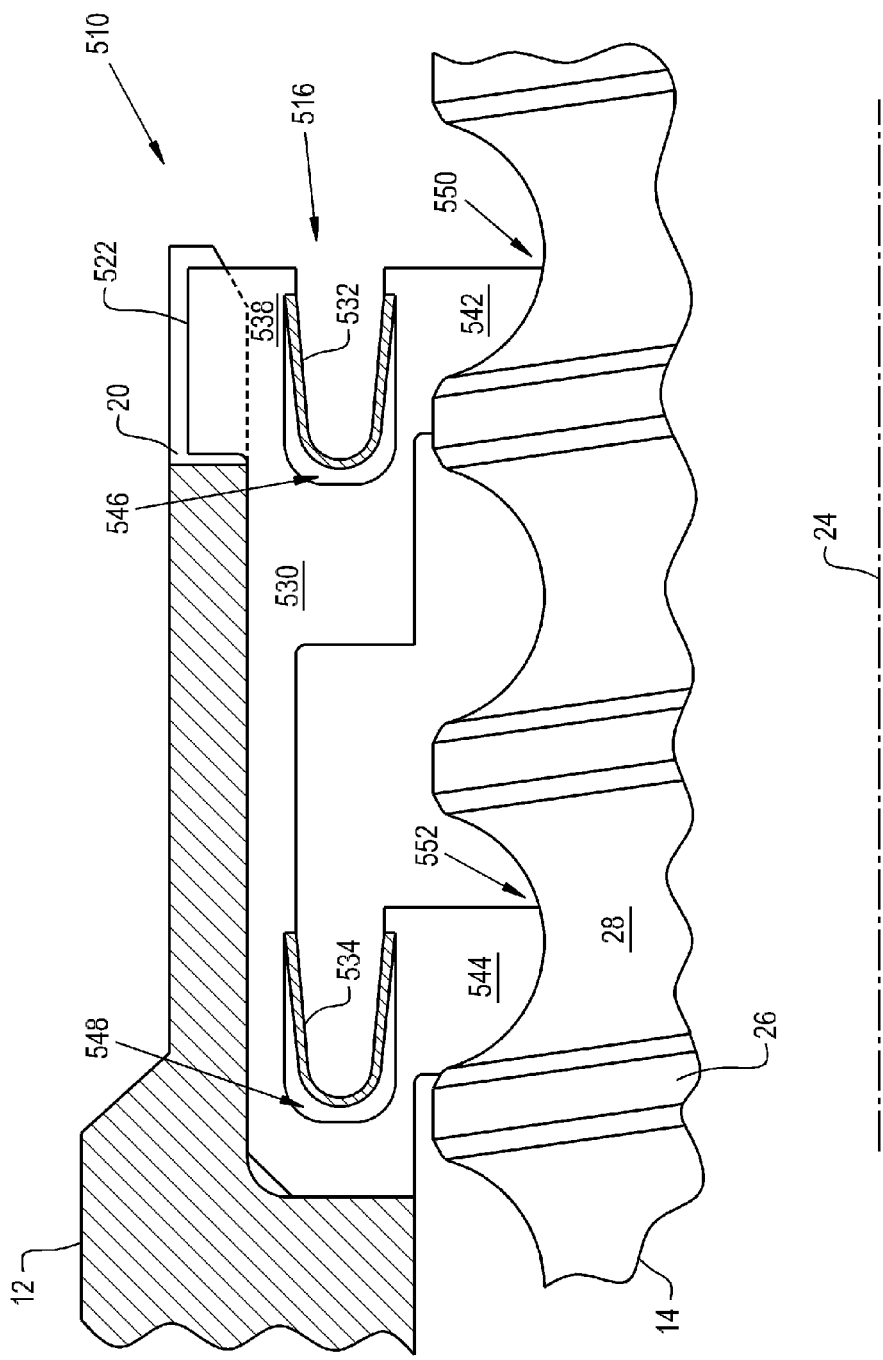
FIG. 8 is a cross-sectional view of yet another embodiment of the ball screw seal system according to the present invention.

FIG. 8 shows yet another embodiment of the ball screw seal system 510 of the present invention. The ball screw seal system 510 includes a housing 12, a threaded rod 14, and a seal assembly 516. Seal assembly 516 fits in a housing groove 18 of housing 12 as described above. Seal assembly 516 includes a seal body 530 and two cantilever springs 532 and 534. Seal body 530 includes two inner lips 542 and 544 which scrape and/or wipe the threaded rod (as described above) as a primary function. Seal assembly 516 can function and be assembled substantially similarly to the embodiment of seal assembly 16 shown in FIG. 1. Further, the materials of the seal assembly 516 can be substantially similar to what is described relative to the seal assembly 16 of FIG. 1. Seal body 530 also forms two axially outwardly facing recesses. Each cantilever spring 532 and 534 is positioned within a corresponding recess 546 and 548 of seal body 530. Each cantilever spring 532 and 534 has an open end that faces axially outwardly. The scraping action of this seal is intended to face the outside environment to keep out debris. Thus, each cantilever spring 532 and 534 faces axially to the outside. This design also provides redundant scraping/wiping (what can be described as "sealing" relative to contaminants from the outside), the two cantilever springs 532 and 534 being inline and facing the outside environment. A greater axial length is required in this embodiment since a hook tool can be required in between the two spring cavities for installation of the seal assembly 16 in the housing groove 18 and/or for removal of the seal assembly 16 from the housing groove 18. FIG. 8 shows that the inner diameter lips 542 and 544 are spaced apart by two screw threads 26 relative to threaded rod 14.

Figure 9:
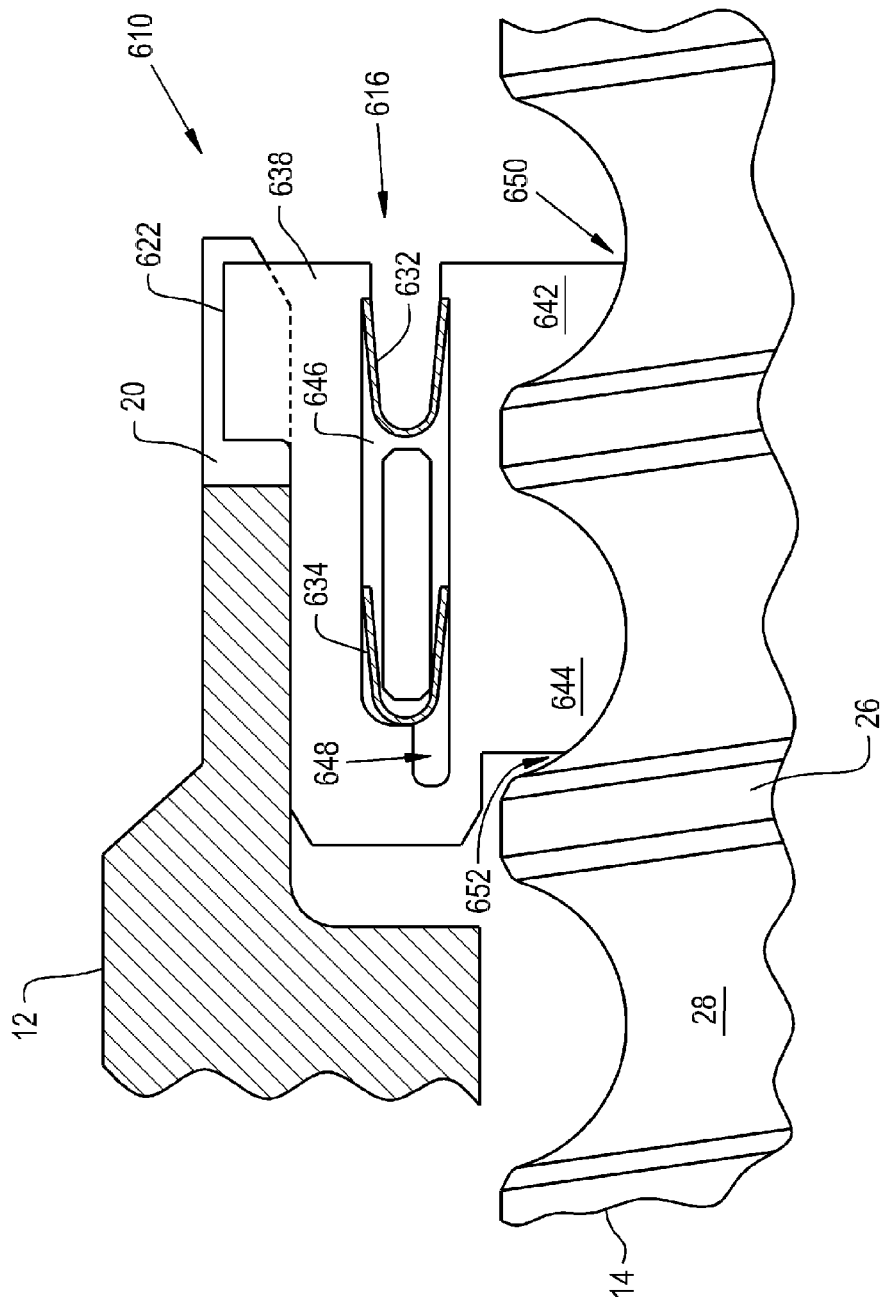
FIG. 9 is a cross-sectional view of still yet another embodiment of the ball screw seal system according to the present invention.

FIG. 9 shows yet another embodiment of a ball screw seal system 610 of the present invention. The ball screw seal system 610 includes a housing 12, a threaded rod 14, and a seal assembly 616. Seal assembly 616 fits in a housing groove 18 of housing 12 as described above. Seal assembly 616 includes a seal body 630 and two cantilever springs 632 and 634. Seal body 630 includes two inner lips 642 and 644 which scrape and/or wipe threaded rod 14 as a primary function at scraping points 650 and 652. Seal assembly 616 can function and be assembled substantially similarly to the embodiment of seal assembly 16 shown in FIG. 1. Further, the materials of the seal assembly 616 can be substantially similar to what is described relative to the seal assembly 16 of FIG. 1. Seal body 630 also forms two axially outwardly facing recesses 646 and 648, which in this embodiment may be connected. Each cantilever spring 632 and 634 has an open end that faces axially outwardly. The item that sets in the mouth of spring 634 may be a flat band expander similar to that shown in FIG. 5. Recess 648 provides for added flexibility of seal assembly 616. The scraping action of this seal is intended to face both direction to keep out debris from the outside environment and to scrape grease at scraping point 652. Each cantilever spring 632 and 634 faces axially to the outside.

The invention in one form is directed to a ball screw seal assembly 16 which includes at least one energizer and a seal body 30, the ball screw seal assembly 16 being configured for being positioned in a housing groove 18, the seal body 30 including at least one outer diameter lip 38 and/or 40 and two inner diameter lips 42 and 44, the at least one outer diameter lip 38 and/or 40 being configured for contacting and option- ally sealing against the housing groove 18, the inner diameter lips 42 and 44 being configured for wiping or scraping an outer surface of a threaded rod including a plurality of threads 26, the inner diameter lips 42 and/or 44 being wipers or scrapers and being spaced apart from one another, with at least one energizer being configured for energizing and thereby biasing each of the inner diameter lips 42 and 44 radially inwardly.

The invention in another form is directed to a ball screw seal system 10 which includes a housing 12, a threaded rod, and a ball screw seal assembly 16, the housing 12 including a housing groove 18, the threaded rod including a plurality of threads 26, the ball screw seal assembly 16 being positioned in the housing groove 18, the ball screw seal assembly 16 including at least one energizer and a seal body 30, the seal body 30 including at least one outer diameter lip 38 and/or 40 and two inner diameter lips 42 and 44, the at least one outer diameter lip 38 and/or 40 being configured for contacting and optionally sealing against the housing groove 18, the inner diameter lips 42 and 44 being configured for wiping or scraping an outer surface of the threaded rod, the inner diameter lips being wipers or scrapers and being spaced apart from one another, the at least one energizer being configured for energizing and thereby biasing each of the inner diameter lips 42 and 44 radially inwardly and onto the outer surface of the threaded rod.

The invention in yet another form is directed to a method of using a ball screw seal assembly 16, the method including the steps of: providing a ball screw seal system 10 which includes a housing 12, a threaded rod, and a ball screw seal assembly 16, the housing 12 including a housing groove 18, the threaded rod including a plurality of threads 26, the ball screw seal assembly 16 being positioned in the housing groove 18, the ball screw seal assembly 16 including at least one energizer and a seal body 30, the seal body 30 including at least one outer diameter lip 38 and/or 40 and two inner diameter lips 42 and 44, the inner diameter lips 42 and 44 being wipers or scrapers and being spaced apart from one another; contacting and optionally sealing the at least one outer diameter lip relative to the housing groove 18; energizing and thereby biasing, using the at least one energizer, each of the inner diameter lips 42 and 44 radially inwardly and onto the outer surface of the threaded rod; and wiping or scraping, using the inner diameter lips 42 and 44, an outer surface of the threaded rod.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A ball screw seal system, comprising:
   a housing;
   a threaded rod; and
   a ball screw seal assembly, the housing including a housing groove, the threaded rod including a plurality of threads, the ball screw seal assembly being positioned in the housing groove, the ball screw seal assembly including:
      at least one energizer; and
      a seal body, the seal body being non-metallic and includes at least one outer diameter lip and two inner diameter lips, the at least one outer diameter lip being configured for contacting and sealing against the housing groove, the inner diameter lips being configured for wiping or scraping an outer surface of the threaded rod, the inner diameter lips being wipers or scrapers and being spaced apart from one another, the at least one energizer being configured for energizing and thereby biasing each of the inner diameter lips radially inwardly and onto the outer surface of the threaded rod.

2. The ball screw seal system of claim 1, wherein the at least one energizer includes a first energizer and a second energizer.

3. The ball screw seal system of claim 2, wherein the first energizer is different than the second energizer.

4. The ball screw seal system of claim 2, wherein said first energizer is substantially the same as the second energizer.

5. The ball screw seal system of claim 2, wherein the threaded rod has an axial direction, the first energizer and the second energizer being positioned in the axial direction from each other.

6. The ball screw seal system of claim 2, wherein at least one of the first energizer and the second energizer is additionally configured to bias the at least one outer diameter lip radially outward.

7. The ball screw seal system of claim 1, wherein the inner diameter lips each have a face directed in substantially the same direction.

8. The ball screw seal system of claim 1, wherein the inner diameter lips each have a face directed in a substantially opposite direction.

9. A ball screw seal assembly, comprising:
   at least one energizer; and
   a seal body, the ball screw seal assembly being configured for being positioned in a housing groove, the seal body being non-metallic and includes at least one outer diameter lip and two inner diameter lips, the at least one outer diameter lip being configured for contacting and sealing against the housing groove, the inner diameter lips being configured for wiping or scraping an outer surface of a threaded rod including a plurality of threads, the inner diameter lips being wipers or scrapers and being spaced apart from one another, the at least one energizer being configured for energizing and thereby biasing each of the inner diameter lips radially inwardly.

10. The ball screw seal assembly of claim 9, wherein said at least one energizer includes a first energizer and a second energizer.

11. The ball screw seal assembly of claim 10, wherein the first energizer is different than the second energizer.

12. The ball screw seal assembly of claim 10, wherein said first energizer is substantially the same as the second energizer.

13. The ball screw seal assembly of claim 10, wherein the threaded rod has an axial direction, the first energizer and the second energizer being positioned in the axial direction from each other.

14. The ball screw seal assembly of claim 10, wherein at least one of the first energizer and the second energizer is additionally configured to bias the at least one outer diameter lip radially outward.

15. The ball screw seal assembly of claim 9, wherein the inner diameter lips each have a face directed in substantially the same direction.

16. The ball screw seal assembly of claim 9, wherein the inner diameter lips each have a face directed in a substantially opposite direction.

17. A method of using a ball screw seal assembly, the method comprising the steps of:
   providing a ball screw seal system which includes:
      a housing;
      a threaded rod; and
      a ball screw seal assembly, the housing including a housing groove, the threaded rod including a plurality of threads, the ball screw seal assembly being positioned in the housing groove, the ball screw seal assembly including:
         at least one energizer; and
         a seal body, the seal body being non-metallic and includes at least one outer diameter lip and two inner diameter lips, the inner diameter lips being wipers or scrapers and being spaced apart from one another;
   contacting and sealing the at least one outer diameter lip relative to the housing groove; and
   energizing and thereby biasing, using the at least one energizer, each of the inner diameter lips radially inwardly and onto an outer surface of the threaded rod; and wiping or scraping, using the inner diameter lips, on the outer surface of the threaded rod.

18. The method of claim 17, wherein the at least one energizer includes a first energizer and a second energizer, wherein the first energizer is different than the second energizer.

19. The method of claim 18, wherein the inner diameter lips each have a face directed in substantially the same direction.

20. The method of claim 18, wherein the inner diameter lips each have a face directed in a substantially opposite direction.

* * * * *